# United States Patent Office 3,324,078
Patented June 6, 1967

3,324,078
STABILIZATION OF POLYALKYLENE OXIDE
WITH IODINE COMPOUNDS
Yutaka Matsui, Ashiya, Japan, assignor to Takeda Chemical Industries, Ltd., Osaka, Japan
No Drawing. Original application June 23, 1961, Ser. No. 119,051. Divided and this application Aug. 23, 1965, Ser. No. 481,957
Claims priority, application Japan, July 1, 1960, 35/30,134
11 Claims. (Cl. 260—45.75)

This application is a division of copending application Ser. No. 119,051, filed June 23, 1961, now abandoned.

This invention relates to stabilization of polyalkylene oxide, more particularly to a novel technique of stabilizing polyalkylene oxide by the addition of certain iodine-containing compounds.

Polyalkylene oxide is a high molecular compound useful in many applications, e.g. plastic industry, fiber industry and pharmaceutical industry, as a valuable dispersion supplement, plasticizer, thickener and binder. Although the polymer may be synthesized via various known processes, it is apt to degrade into lower molecular weight compounds at high temperature or when stored for a long period of time, regardless of the process or catalyst employed in its preparation. Such an unstable nature of the polymer is easily understandable from its chemical structure.

Such being the case, in order to keep the chemical and physical properties of the polymer constant while processing at high temperature or during storage, suitable stabilizers for preventing degradation of the polymer have been investigated by many chemists. The present inventor has also searched for effective stabilizers which are suitable for preventing the degradation of the polymer when heated as well as during storage. For the purpose, the present inventor has studied the stability of the polymer when admixed with many kinds of other compounds, and found that certain compounds having at least one iodine radical have strong effects in stabilizing polyalkylene oxide; in other words, they substantially prevent degradation of the polymer at room- or high-temperatures.

An object of the present invention is to provide a method for preventing polyalkylene oxide, particularly poly(lower) alkylene oxide, from degradation by heating or during storage. Another object is to provide a stabilized polyalkylene oxide composition. These objects are realized by the addition of one or more of certain compounds having at least one iodine atom to polyalkylene oxide in various forms.

The following compounds are useful as stabilizers in the present invention: lower alkyl iodide (e.g. ethyl iodide and propyl iodide), aralkyl iodide (e.g. benzyl iodide), aryl iodide, metal iodide (e.g. antimony triiodide, potassium iodide, bismuth triiodide, zinc iodide and stannous iodide) and ammonium iodide.

In the present invention, the stabilizers may be used alone or in combination, and if necessary, or desirable, they may be employed together with other known stabilizers for polyalkylene oxide.

The polyalkylene oxide to be stabilized in the present invention includes e.g. polyethylene oxide and polypropylene oxide, at any degree of polymerization. Moreover, so-called "block copolymer" having optional intrinsic viscosity may also be stabilized by the method of this invention. The constituents of the block copolymer may be, e.g. ethylene oxide and propylene oxide. The polymer to be stabilized may be in the form of solid, paste or liquid, or in any other form. Moreover, a mixture composed of the polymer and other substances or a processed article of the polymer which may be contaminated with other materials or a solution of the polymer or the like can also be stabilized by the method of this invention. The addition of the aforesaid stabilizer to the polymer may conveniently be carried out in a manner similar to that of known stabilizers. More specifically, when the polymer to be stabilized is in solid form, the stabilizer may be added to its solution or suspension in a suitable solvent such as benzene, acetonitrile or water. The solvent may then be distilled off, if necessary. The solid polymer may also be kneaded with the stabilizer. The addition may be carried out before or during or after the processing of the polymer.

The quantity of stabilizer which can exhibit the objective stabilizing effect on the polymer is at least 0.5% by weight of the polyalkylene oxide to be stabilized, and the most preferable quantity is generally between 0.5 to 5% by weight.

Polyalkylene oxide thus stabilized or a mixture containing said polyalkylene oxide or their processed articles are effectively prevented from degradation or depolymerization even when they are processed or handled under heating or stored for a long time at room temperature. Namely, by the addition of the stabilizer in the method of this invention, decomposition or depolymerization of polyalkylene oxide is substantially inhibited at room or high temperature.

The stabilizing effect on polyalkylene oxide of the stabilizer of this invention was observed in comparison with that of several known stabilizers. For purposes of comparison, the stability of polyalkylene oxide was observed without the addition of any stabilizer. The method and the results are shown below.

SPECIMENS OF POLYALKYLENE OXIDE (1) Polyethylene oxide whose molecular weight is about 2,000,000.
(2) Polypropylene oxide whose molecular weight is about 1,000,000.

METHOD OF MEASUREMENT

The polyalkylene oxide is dissolved in distilled water (for polyethylene oxide) or in benzene (for polypropylene oxide) to prepare a 0.1% solution (percentage is by weight). To 200 milliliters of the solution is added 5 milligrams of the stabilizer, then the mixture is left standing at 90° C. for 24 hours. Before and after heating, the viscosity of each sample is measured by "Ubbelohde's Viscosimeter." From the viscosity of each sample, the degree of degradation was calculated.

Results:

| Stabilizer | Degree of degradation in percent | |
|---|---|---|
|  | Polyethylene oxide | Polypropylene oxide |
| Ethyl iodide | 15.5 |  |
| Benzyl iodide | 20.5 |  |
| Ammonium iodide | 21.0 |  |
| Antimony triiodide | 17.2 |  |
| Zinc iodide | 13.5 |  |
| Stannous iodide | 22.8 |  |
| Bismuth triiodide | 22.0 |  |
| Potassium iodide | 23.1 |  |
| Normalpropyl gallate | 84.7 | 90.6 |
| Paranitrosodiphenylamine | 70.6 | 81.5 |
| Paraphenylenediamine | 52.3 | 40.8 |
| Hydroquinone | 89.8 |  |
| Control | 97.4 | 96.5 |

From the above results, it is apparent that the stabilizers of the present invention have an excellent effect on the stabilization of polyalkylene oxide. Moreover, it is advantageous that the polyalkylene oxide to which the stabilizer has been added can be processed without the addition of plasticizer or softener. Also, the polymer can be used or stored without decomposition or depolymerization at room or high temperature or in humid places.

The present method is not restricted by the form, purity, and degree of polymerization of the polyalkylene oxide, nor by the time of addition of the stabilizer.

The following non-limitative examples represent presently preferred illustrative embodiments of the invention. It has illustrative meaning only, and is not meant to restrict the scope of the invention. In the examples, all percentages are in weight percent, temperatures are shown in degrees centigrade, and the relationship between part by weight and part by volume is the same as that between gram and milliliter.

*Example*

Polyethylene oxide whose average molecular weight is about 2,000,000 is dissolved in distilled water to make a 0.1% aqueous solution. To 200 milliliters of the solution is added 5 milligrams of potassium iodide, then the mixture is sufficiently agitated. Upon evaporation of water from the mixture, stable polyethylene oxide is obtained.

In the same manner as above, polypropylene oxide can be stabilized by means of potassium iodide. And, to obtain similar results, ethyl iodide, propyl iodide, benzyl iodide, ammonium, iodide, zinc triiodide, stannous iodide or bismuth triiodide can be employed instead of potassium iodide.

What is claimed is:

1. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of a member selected from the group consisting of ethyl iodide, propyl iodide, benzyl iodide, ammonium iodide, antimony triiodide, zinc triiodide, stannous iodide, bismuth triiodide and potassium iodide, whereby the polyalkylene oxide is rendered resistant to change in intrinsic viscosity and whereby further processing thereof can be carried out in the absence of plasticizer and of softener.

2. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of potassium iodide, whereby the polyalkylene oxide is rendered resistant to changes in intrinsic viscosity and whereby further processing thereof can be carried out in the absence of plasticizer and of softener.

3. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of ethyl iodide, whereby the polyalkylene oxide is rendered resistant to changes in intrinsic viscosity and whereby further processing thereof can be carried out in the absence of plasticizer and of softener.

4. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of propyl iodide, whereby the polyalkylene oxide is rendered resistant to changes in intrinsic viscosity and whereby further processing thereof can be carried out in the absence of plasticizer and of softener.

5. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of benzyl iodide, whereby the polyalkylene oxide is rendered resistant to changes in intrinsic viscosity and whereby further processing thereof can be carried out in the absence of plasticizer and of softener.

6. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of ammonium iodide, whereby the polyalkylene oxide is rendered resistant to changes in intrinsic viscosity and whereby further processing thereof can be carried out in the absence of plasticizer and of softener.

7. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of zinc triiodide, whereby the polyalkylene oxide is rendered resistant to changes in intrinsic viscosity and whereby further processing thereof can be carried out in the absence of plasticizer and of softener.

8. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of stannous triiodide, whereby the polyalkylene oxide is rendered resistant to changes in intrinsic viscosity and whereby further processing thereof can be carried out in the absence of plasticizer and of softener.

9. Polyalkylene oxide which has been stabilized against deteriorative influences during storage and upon heating and which consists essentially of a member selected from the group consisting of polyethylene oxide, polypropylene oxide and block polymer of polyethylene oxide and polypropylene oxide, and of from about 0.5% to about 5% relative to the weight of the polyalkylene oxide, substantially uniformly distributed throughout the latter, of bismuth triiodide, whereby the polyalkylene oxide is rendered resistant to changes in intrinsic viscosity and whereby further processing thereof can be carried out in the absence of plasticizer and of softener.

10. Polyethylene oxide which has been stabilized against deteriorative influences during storage and upon heating and which consists essentially of polyethylene oxide and of from about 0.5% to about 5% relative to the weight of the polyethylene oxide, substantially uniformly distributed throughout the latter, of a member selected from the group consisting of ethyl iodide, propyl iodide, benzyl iodide, ammonium iodide, antimony triiodide, zinc triiodide, stannous iodide, bismuth triiodide and potassium iodide, whereby the polyethylene oxide is rendered resistant to changes in intrinsic viscosity and whereby further processing thereof can be carried out in the absence of plasticizer and of softener.

11. Polypropylene oxide which has been stabilized against deteriorative influences during storage and upon heating and which consists essentially of polypropylene oxide and of from about 0.5% to about 5% relative to the weight of the polypropylene oxide, substantially uniformly distributed throughout the latter, of a member selected from the group consisting of ethyl iodide, propyl, iodide, benzyl iodide, ammonium iodide, antimony triiodide, zinc triiodide, stannous iodide, bismuth triiodide and potassium iodide, whereby the polypolylene oxide is rendered resistant to changes in intrinsic viscosity and whereby further processing thereof can be carried out in the absence of plasticizer and of softener.

References Cited
UNITED STATES PATENTS 3,146,273  8/1964  Orloff et al. _____ 260—45.95 X

FOREIGN PATENTS 1,293,929  4/1962  France.

LEON J. BERCOVITZ, *Primary Examiner.*

M. J. WELSH, *Assistant Examiner.*